Patented Oct. 7, 1941

2,257,903

UNITED STATES PATENT OFFICE 2,257,903

MIXTURE OF ISOMERIC ETHYL DIBROMOBENZENES

Robert R. Dreisbach, Midland, Mich., assignor to The Dow Chemical Company, Midland, Mich., a corporation of Michigan No Drawing. Application February 21, 1940, Serial No. 320,095

1 Claim. (Cl. 260—650)

This invention relates to non-flammable liquid compositions.

The compositions of the invention consist essentially of mixtures of nuclearly brominated mono-ethyl benzenes in which the bromine content corresponds to between about 2.0 and about 3.0 atoms of bromine per mol of ethyl benzene. The new products are non-flammable, non-corrosive liquids having high boiling points, moderately high specific gravities, low viscosities, and excellent electrical characteristics. Those compositions containing between 2.0 and 2.5 atoms of bromine per mol of ethyl benzene also have unusually low freezing points. Because of this combination of desirable properties, the products are useful as heat-transfer fluids, as dielectric agents, and as fire-extinguishing and fire-proofing compositions.

In a preferred method of making the new products, a mixture of ethyl benzene and a small proportion, e. g. 0.5 to 2.0 per cent by weight, of iron filings, or other catalyst for the nuclear halogenation of aromatic hydrocarbons, is agitated at approximately room temperature, and liquid bromine is added slowly until 2.0 to 3.0 mols of bromine per mol of ethyl benzene have been introduced. The resulting mixture is then washed with water, neutralized with aqueous alkali, and dried. The dried product may be used directly, but is preferably subjected to a rough distillation to remove traces of low-boiling materials and tars. In either case, the material obtained is a complex mixture of nuclearly brominated ethyl benzenes in which the bromine content corresponds to between about 2.0 and about 3.0 atoms of bromine per mol of ethyl benzene (60 per cent to 70 per cent by weight of bromine). Separation of the mixture into its components is extremely difficult, if not impossible, and from a practical standpoint is undesirable, since it has been found that many of the probable components, when prepared in the pure state by other synthetic methods, do not have the desirable properties of the new products.

The brominated ethyl benzene mixtures of the invention are substantially colorless liquids, and exhibit physical properties within the following ranges, depending on the degree of bromination: normal boiling point 250° C. to 310° C.; freezing point, below —70° C. to +20° C.; specific gravity, 1.74 to 2.06; viscosity at 100° F., 24 to 76 millipoises; dielectric constant at 1000 cycles, 4.6 to 4.25; and electrical resistivity, about $12 \times 10^{12}$ ohms per centimeter. Those products containing less than 2.5 atoms of bromine per mol of ethyl benzene all have freezing points below —28° C. The new products are totally non-flammable, even at their boiling points, and are non-corrosive toward metals.

Because of their low freezing points, high boiling points, relatively low viscosities, non-corrosiveness, and non-flammability, the new mixtures are useful as heat-transfer agents, particularly as cooling fluids for airplane motors. These same properties, together with the excellent electrical characteristics, render the products suitable for use as transformer oils. They may also be employed as fire-extinguishants and as impregnating agents for making fire-resistant articles of cloth and wood. For all these uses, the new products may be employed alone or in admixture with other halogenated materials.

The following examples will illustrate the invention but are not to be construed as limiting its scope:

Example 1

A mixture of 20 pounds of mono-ethyl benzene and 0.22 pound of iron filings was agitated at room temperature and 60.4 pounds of bromine was added slowly during 13.0 hours. The resulting mixture was washed successively with water and with aqueous alkali, and was then dried. The dried product had a bromine content corresponding to 2.0 atoms of bromine per mol of ethyl benzene; it boiled largely in the temperature range 243° to 295° C. This material was distilled to eliminate low-boiling oils and high-boiling residue; there was recovered 33.8 pounds of a liquid consisting essentially of a complex mixture of nuclearly brominated ethyl benzenes in which the bromine content corresponded to 2.0 atoms of bromine per mol of ethyl benzene. This product had a boiling range of 255° to 260° C., (490° to 500° F.), a specific gravity of 1.74 at 25°/25° C., and a viscosity at 100° F. of 24 millipoises. It did not freeze even at —70° C. (—94° F.).

Example 2

A portion of the nuclearly brominated ethyl benzene mixture prepared as in Example 1 was heated for 6 hours at a temperature of 110° C. in contact with a weighed sample of aluminum foil. There was no observable corrosion of the aluminum.

This application is a continuation-in-part of my co-pending application Serial No. 147,866, filed June 12, 1937.

It is to be understood that the foregoing description is illustrative rather than strictly limitative, and that the invention is co-extensive in scope with the following claim:

I claim:

A non-flammable liquid composition suitable for use as a heat-transfer medium, dielectric fluid, and fire-retarding and extinguishing agent, consisting of a mixture of isomeric nuclearly brominated ethyl benzenes in which the bromine content corresponds to about 2.0 atoms of bromine per mol of ethyl benzene, such composition having a freezing point below —70° C. and a boiling point of about 255° to 260° C.

ROBERT R. DREISBACH.